(12) United States Patent
Wiker

(10) Patent No.: US 8,534,378 B2
(45) Date of Patent: Sep. 17, 2013

(54) TRANSMISSION, IN PARTICULAR FOR ELECTRIC HAND-HELD POWER TOOLS

(75) Inventor: Juergen Wiker, Hangzhou/Bing Jiang District (CN)

(73) Assignee: Robert Bosch GmbH, Stuttgart (DE)

( * ) Notice: Subject to any disclaimer, the term of this patent is extended or adjusted under 35 U.S.C. 154(b) by 868 days.

(21) Appl. No.: 11/993,659

(22) PCT Filed: Nov. 22, 2006

(86) PCT No.: PCT/EP2006/068751
§ 371 (c)(1),
(2), (4) Date: Dec. 21, 2007

(87) PCT Pub. No.: WO2007/087909
PCT Pub. Date: Aug. 9, 2007

(65) Prior Publication Data
US 2010/0018736 A1    Jan. 28, 2010

(30) Foreign Application Priority Data
Jan. 16, 2006  (DE) .......................... 10 2006 001 985

(51) Int. Cl.
*E21B 4/04* (2006.01)

(52) U.S. Cl.
USPC ................ 173/217; 173/210; 464/82; 464/92

(58) Field of Classification Search
USPC ..................... 173/210, 216, 217; 464/82, 92; 74/411, 421 A
See application file for complete search history.

(56) References Cited

U.S. PATENT DOCUMENTS

| | | | | |
|---|---|---|---|---|
| 1,425,616 | A | * | 8/1922 | Tarbox ............................. 464/74 |
| 2,961,856 | A | * | 11/1960 | Selzer .............................. 464/74 |
| 3,802,518 | A | | 4/1974 | Albert |
| 4,307,584 | A | * | 12/1981 | Sandiumenge ................. 464/74 |
| 4,448,098 | A | | 5/1984 | Totsu |
| 5,016,501 | A | | 5/1991 | Holzer, Jr. |
| 5,873,786 | A | * | 2/1999 | Hosoya et al. .................. 464/73 |
| 6,045,448 | A | * | 4/2000 | Kern et al. ....................... 464/74 |
| 6,149,176 | A | * | 11/2000 | Fujii ............................. 280/284 |
| 6,295,910 | B1 | * | 10/2001 | Childs et al. ............... 83/698.11 |
| 7,048,107 | B1 | | 5/2006 | Geis et al. |
| 7,357,195 | B2 | * | 4/2008 | Kamimura et al. ........... 173/216 |
| 2002/0130007 | A1 | | 9/2002 | Nakamura et al. |
| 2006/0191365 | A1 | * | 8/2006 | Stierle et al. .................... 74/411 |

FOREIGN PATENT DOCUMENTS

| | | |
|---|---|---|
| DE | 41 20 617 | 12/1992 |
| DE | 197 50 262 | 5/1999 |
| DE | 199 49 485 | 4/2001 |
| DE | 100 03 773 | 8/2001 |
| DE | 100 59 186 | 6/2002 |
| DE | 102 59 519 | 7/2004 |
| EP | 1 122 390 | 8/2001 |
| GB | 2 327 254 | 1/1999 |
| JP | 63-67298 | 5/1988 |
| JP | 2001-140949 | 5/2001 |
| JP | 2001-208102 | 8/2001 |
| JP | 2002-206573 | 7/2002 |
| JP | 2003-56596 | 2/2003 |
| WO | 2004/056525 | 7/2004 |
| WO | 2004/056535 | 7/2004 |

* cited by examiner

*Primary Examiner* — Hemant M Desai
*Assistant Examiner* — Gloria R Weeks
(74) *Attorney, Agent, or Firm* — Michael J. Striker

(57) ABSTRACT

The invention relates to a gearing, in particular for portable electric power tools, preferably for angle grinders, comprising an automatic locking device (6, 15). According to the invention, provision is made for damping elements (20) to be integrated in the locking device module.

6 Claims, 3 Drawing Sheets

TRANSMISSION, IN PARTICULAR FOR ELECTRIC HAND-HELD POWER TOOLS

BACKGROUND OF THE INVENTION

Figure 1:
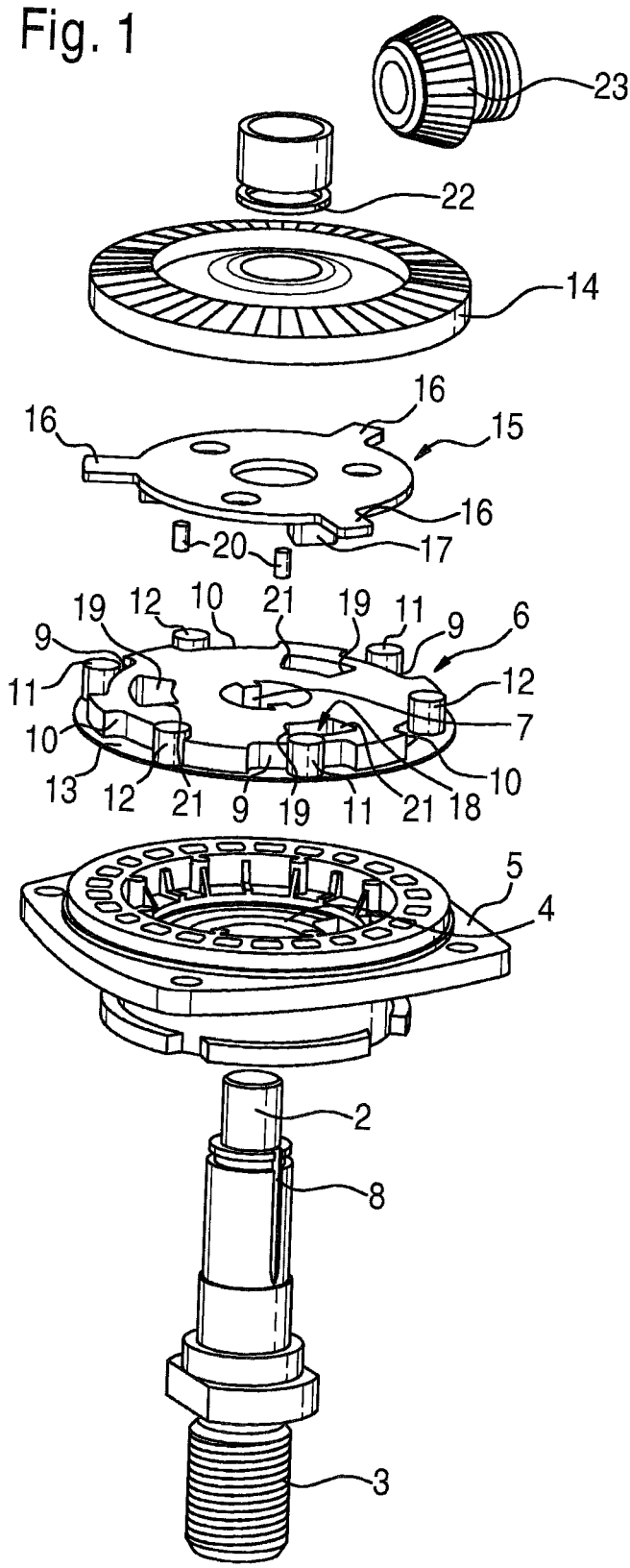

The present invention relates to a transmission, in particular for electric hand-held power tools, and preferably for angle grinders.

With angle grinders, a manually operated locking device (spindle lock) is usually provided on the transmission housing. By pressing and holding a button, it is ensured that the spindle does not rotate when the grinding disk is installed or removed. This is attained by the fact that, when the locking device is actuated, a bolt engages in a recess in the driven gear, thereby preventing it from rotating. Since the driven gear is fixedly connected with the spindle, the spindle is also prevented from rotating. Manual locking devices for electric hand-held power tools are known, e.g., from U.S. Pat. No. 4,448,098 and U.S. Pat. No. 3,802,518.

Automatic locking devices are also known with drills, drill/drivers, and rotary hammers. The known locking devices automatically block the spindle when torque is transferred from the spindle to the drive. When torque is transferred from the drive to the spindle, the spindle is automatically released. Electric hand-held power tools of this type with automatic locking devices are described in DE 100 03 773 A1 and U.S. Pat. No. 5,016,501.

From publication DE 102 59 519 A1 it is known to dampen vibrations in the drive train of electric hand-held power tools using resilient damping elements located between the driven gear and the spindle.

BRIEF SUMMARY OF THE INVENTION

The object of the present invention is to provide a transmission with an automatic locking device, with which vibrations in the drive train are reduced and that requires only a small amount of installation space.

This object is achieved via the features of claim 1. Advantageous embodiments of the present invention are defined in the subclaims.

The present invention is based on the idea of integrating a locking device (spindle lock) and transmission damping in a transmission, in particular for angle grinders. To reduce the amount of axial installation space required, it is provided according to the present invention that the transmission damping is an integral component of the locking device. In other words, the locking device and the transmission damping are a single assembly. According to the present invention, the vibrations in the drive train are absorbed by at least one resilient damping element located in the circumferential direction between a driving element of the driven gear and a counter-element of the locking device that is non-rotatably coupled with the spindle. The driving element is adjustable relative to the counter-element in the circumferential direction about a limited circumferential angle. When the driven gear is acted upon with a torque by the driving gear, which is driven by the drive, the damping element is pressed by the driving element against the counter-element in the circumferential direction, thereby elastically deforming the damping element and damping the vibrations in the drive train. The vibrations that occur are due, e.g., to production-related tolerances. By providing the at least one damping element, is vibrations are reduced, operating noises are minimized, and the peak loads on the toothed structure that occur during start-up of the drive and during operation are reduced. Rubber-like material may be used, e.g., as the damping material. It is also feasible to use fluids—viscous fluids, in particular—filled in small cushions.

A decisive factor in realizing the present invention is the fact that the resilient damping element engages with the counter-element, which is non-rotatably connected with a component of the locking device, or it is connected therewith as one piece. The counter-element is preferably located on a clamping disk of the locking device. Blocking elements, in particular rolling elements, may be clamped between the clamping disk and the circumferential wall that encloses the locking device. Given that the clamping disk is non-rotatably coupled with the spindle, the spindle—which is used to attach tools, in particular cutting disks—is also prevented from rotating.

To minimize the installation space in the axial direction, it is provided in a refinement of the present invention that either the driving element or the counter-element is designed as an axial extension that engages axially in a pocket. The pocket therefore forms the counter-element and/or the driving element. To transfer torque, the extension—which extends axially into the pocket—bears against a radial wall of the pocket. According to a preferred embodiment, the counter-element is designed as a pocket, and the driving element is designed as an extension. The pocket is formed in the side of the clamping disk that faces the driven gear. The extension, which is non-rotatably coupled with the driven gear, is displaceable in the circumferential direction inside the pocket about a circumferential angle limited by the distance between the radial walls of the pocket. The distance between the radial walls in the circumferential direction therefore defines the circumferential angle about which the driven gear is rotatable relative to the spindle. With transmissions that may be driven in both circumferential directions, it is advantageous when at least one damping element is located on both sides of the extension in the pocket. The damping material may be positioned in various manners. It is feasible for the damping element to be placed loosely in the intermediate space between the extension and the pocket wall. It is also possible to fixedly connect the damping elements with the driving element and/or the counter-element using suitable measures, e.g., vulcanizing.

Instead of the combination of pocket and extension as the counter-element and driving element, it is feasible to provide two extensions, which may be brought to bear against each other.

It has proven advantageous to not attach the driving element directly to the driven gear or to design it as a single piece therewith, but rather to locate it on a driving disk, which is non-rotatably connected with the driven gear, or to design it as a single piece therewith. The driving element may also be located directly on the driven gear, however.

According to a particularly advantageous design of the locking device, the clamping disk includes—on its outer circumference—at least one, and preferably three recesses located in the circumferential direction with separation between them. These first recesses extend across a circumferential section and widen radially in a first circumferential direction (the direction of rotation). Blocking elements, preferably rolling elements, are located in the recesses. The diameter of the blocking elements is dimensioned such that the blocking elements are clampable in the narrow region of the recess between the inner wall of the recess and the circumferential wall that encloses the locking device. The circumferential wall is preferably formed by the transmission housing. The blocking elements are accommodated in the wider region of the recess in such a manner that the clamping disk may rotate within the circumferential wall. When the clamping disk is rotated in the direction of the widening recess, the blocking elements travel—due to their inertia—into the narrower region and thereby prevent the clamping disk—and, therefore, the spindle, which is non-rotatably coupled with the clamping disk—from rotating further.

If the spindle should also be blockable in the opposite circumferential direction, e.g., to release the tool, then, according to the present invention, at least one second recess—and preferably at least three second recesses—is/are provided with blocking elements, and the second recesses widen in the radial direction—as do the first recesses—in the opposite circumferential direction.

To release the spindle when it is driven via the driven gear by the drive—which is an electric motor in particular—it is provided in a refinement of the present invention to provide at least one finger that extends in the radial direction, with which the blocking elements may be transferred from the narrower region to the wider region and held there when the driven gear is rotated in the direction of the wider region of the recesses, thereby preventing the blocking elements from traveling back into the narrower recess region and preventing the spindle from rotating further. If the transmission is drivable in both circumferential directions, the finger must slide the blocking elements—depending on the direction of rotation—into the first recesses, or it must slide the blocking elements into the second recesses in the direction of rotation. It is feasible to assign a separate finger to each blocking element, the finger engaging behind the particular blocking element in the radial direction.

Advantageously, the extension and the finger are located on the driving disk. The circumferential angle around which the finger is displaceable is limited by the distance between the radial walls of the pocket into which the extension engages axially. To ensure that the finger may displace the associated blocking element in the circumferential direction, it is advantageous when the blocking element extends axially out of its recess in the direction of the finger, so that the blocking element may be captured by the finger when the finger is rotated. It is also possible to design the finger with a bent shape, so that it engages in the pocket.

BRIEF DESCRIPTION THE DRAWING(S)

Further advantages and advantageous embodiments are depicted in the further claims, the description of the figures, and the drawing.

Figure 2:
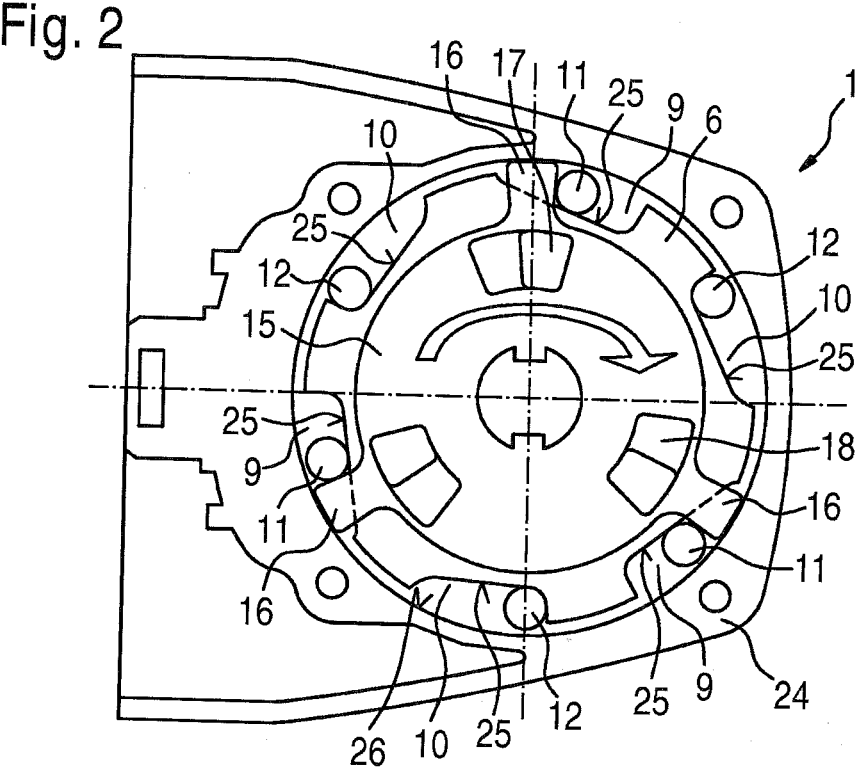
Figure 3:
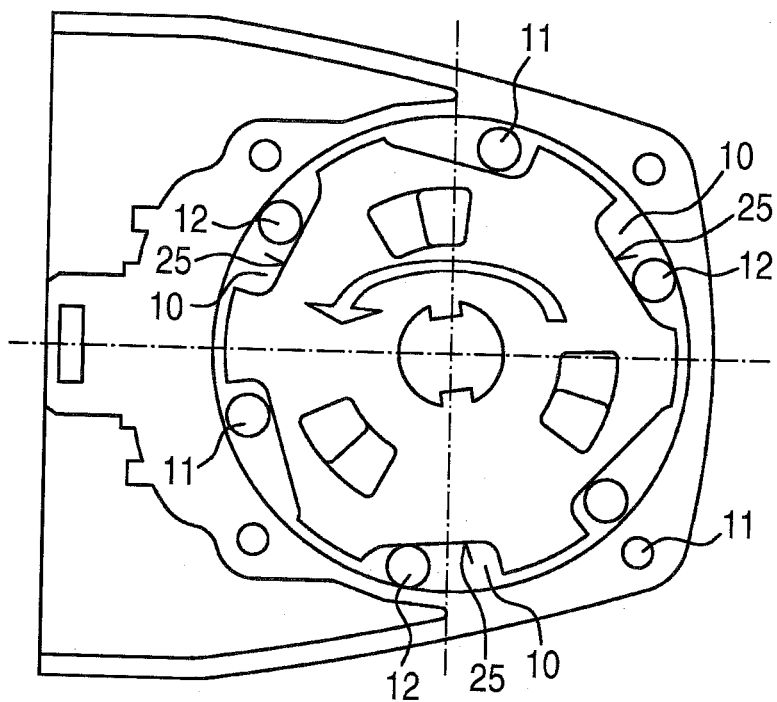
Figure 4:
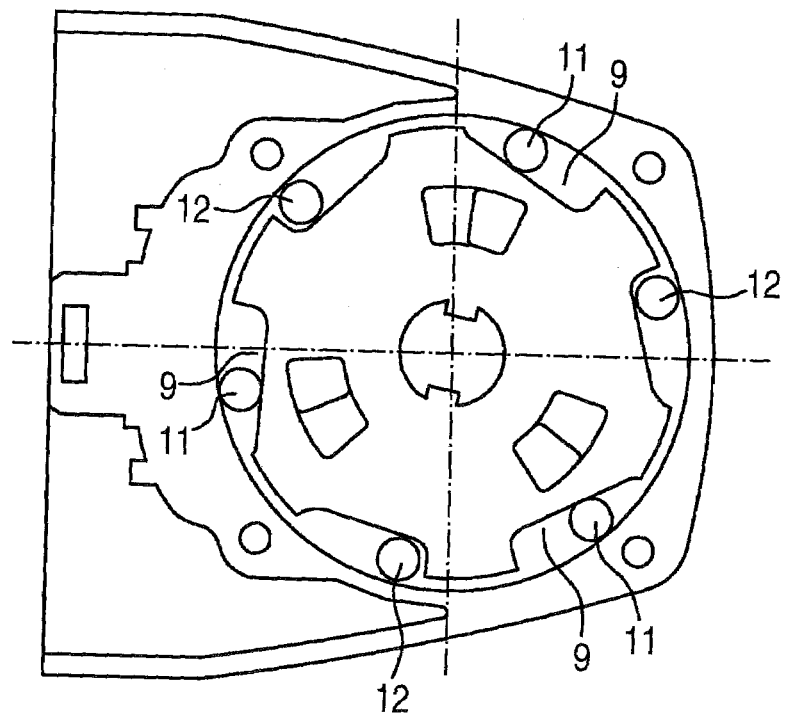
Figure 5:
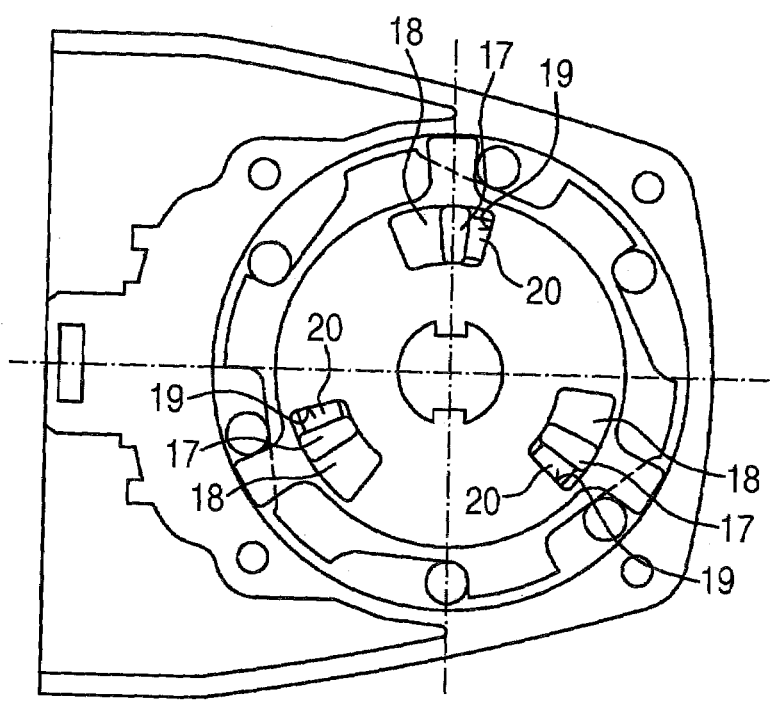

FIG. 1 shows an exploded view of the inventive transmission,

FIG. 2 shows a cross section of the transmission, which is installed in the transmission housing, as viewed from the pinion toward the spindle, which is driven in the clockwise direction by a drive, but without transmission damping, FIG. 3 shows a cross section of the transmission when the locknut is tightened on the spindle, with the drive shut off, but without transmission damping, FIG. 4 shows a cross section of the transmission when the locknut is loosened on the spindle, with the drive shut off, but without transmission damping, and FIG. 5 shows a cross section of the transmission with transmission damping integrated in the locking device.

DETAILED DESCRIPTION OF THE INVENTION

Identical components and components with the same functionality are labelled with the same reference numerals in the Figures.

A transmission 1 for an angle grinder is shown in the figures. The components of transmission 1 are shown in an exploded view in FIG. 1. Transmission 1 includes a spindle 2 with a thread 3 located on its free end for securing a not-shown grinding disk using a not-shown locknut.

The transmission also includes a ball bearing 4 with an outer bearing flange 5. In the installed state, spindle 2 is connected with ball bearing 4 via pressing. Transmission 1 also includes a clamping disk 6, which, in the installed state, is also non-rotatably coupled with spindle 2 via pressing. Clamping disk 6 is also retained via two wedges 7—which extend radially inward and in the axial direction—in two grooves 8—which also extend in the axial direction—formed in the outer circumference of spindle 2. Clamping disk 6 is therefore connected with spindle 2 in a form-fit and non-positive manner.

On the outer circumference, clamping disk 6 includes three first recesses 9 and three second recesses 10, which are offset relative to first recesses 9. First recesses 9 widen radially in the clockwise direction. Second recesses 10 narrow radially in the clockwise direction. First blocking elements 11 and second blocking elements 12 are located in recesses 9, 10 of clamping disk 6. Blocking elements 11, 12 rest on base 13 of clamping disk 6 and are free to move in the radial and tangential directions. On the side opposite to base 13, blocking elements 11, 12 are limited by a driven gear 14 designed as a crown wheel. It is even more advantageous when the blocking elements are not located on a base 13 that is non-rotatably connected with clamping disk 6, but rather on a disk that is non-rotatably connected with bearing flange 5. The adjusting behavior of blocking elements 11, 12 is improved as a result.

A driving disk 15 is located between driven gear 14 and clamping disk 6, which is non-rotatably connected with the underside of driven gear 14 using suitable measures, such as screwing or welding. Three fingers 16, which engage behind first blocking elements 11 in the radial direction, extend away from driving disk 15 in the radial direction. Three driving elements 17 designed as extensions extend in the axial direction, toward clamping disk 6. In the installed state, driving elements 17 engage in associated pockets 18 in top side of driving disk 15. Via driving elements 17, the torque applied to driven gear 14 is transferred to counter-elements of clamping disk 6 designed as pockets 18. The torque is transferred by driving elements 17 to radial walls 19 of pockets 18. In the installed state, damping elements 20—with which vibrations in the drive train may be damped—are located between radial walls 19 and driving elements 17. When torque is transferred, the damping elements deform elastically and are clamped between walls 19 and driving elements 17. If the intention is to use transmission 1 shown, e.g., in a drill with two directions of rotation, it is advantageous when damping elements are also located between walls 21 of pockets 18 opposite to walls 19, and driving elements 17.

Driven gear 14 is supported on spindle 2 in such a manner that it may rotate freely. In the upward axial direction, driven gear 14 is held in its position by a snap ring 22. At the bottom, driven gear 14 rests on clamping disk 6.

Driven gear 14 is driven via a drive gear, which is designed as pinion 23, meshes with driven gear 14, and is driven by an electric-motor drive via a shaft.

The function of the locking device, which is composed of driving disk 15 with driving elements 17, clamping disk 6 with pockets 18, recesses 9, 10, and blocking elements 11, 12, will be described in greater detail below with reference to FIGS. 2 through 4. For clarity, damping elements 20 are not shown in FIGS. 2 through 4. They are located in the circumferential direction between driving elements 17 and front—as viewed in the clockwise direction—walls 19 of pockets 18.

FIG. 2 shows a cross section of a locking device that has been installed in a transmission housing 24, as viewed from drive gear 23 in the direction toward ball bearing 4. FIG. 2 shows the operating state, i.e., driven gear 14 and driving disk 15 non-rotatably connected thereto are driven in the direction of rotation indicated by the arrow. Driving elements 17 engage in pockets 18 of clamping disk 6. The torque is transferred by driven gear 14 via driving disk 15 with driving elements 17 to clamping disk 6 and, therefore, spindle 2. At the same time, fingers 16 move the three first blocking elements 11—of the six blocking elements 11, 12 in all—in the clockwise direction out of their blocked position in the region of radially narrow circumferential section of recesses 9. This is necessary, because first blocking elements 11 would otherwise get stuck between inner wall 25 of first recesses 9 and non-rotatable circumferential wall 26 formed by transmission housing 24 (spindle lock function or locking function).

Due to their inertia, the three second blocking elements 12 are pressed against the rear—as viewed in the clockwise direction—radial wall of associated second recesses 10. This effect is improved further when blocking elements 11, 12 do not rest on a base 13 that is non-rotatably connected with clamping disk 6, but rather on a disk that is non-rotatably connected with bearing flange 5. Inner walls 25 of second recesses 10 are slanted differently than the inner walls of first recesses 9. Second blocking elements 12 therefore travel to the wider side of the recesses, where they cannot become stuck.

Driving disk 15 is not shown in FIG. 3. FIG. 3 shows the state that exists when the not-shown locknut is being tightened in the counterclockwise direction (in the direction of the arrow). The drive is shut off during this procedure. When a tightening torque is applied to the not-shown locknut, spindle 2 rotates and, therefore, clamping disk 6 also rotates by a small amount in the counterclockwise direction, until three second blocking elements 12 travel in their second recesses 10 along inner walls 25 into narrower region of second recesses 10 and become stuck between circumferential wall 26 and inner wall 25 of clamping disk 6. Spindle 2 is therefore prevented from rotating further and the tightening torque may be applied to tighten the locknut.

Driving disk 15 is not shown in FIG. 4, either. The state in which the locknut is being loosened is shown here. During the loosening procedure, three first blocking elements 11 travel along inner wall 25 of first recesses 9 into the narrower region of recesses 9 and become stuck between circumferential wall 26 and inner walls 25 of first recesses 9. The torque for loosening the locknut may therefore be applied without also rotating spindle 2.

FIG. 5 shows the state in FIG. 2, but with damping elements 20 made of rubber-like material shown between driving elements 17 and radially extending walls 19 of pockets 18. With the configuration shown, vibrations are damped when driving takes place in the clockwise direction. It is feasible to also locate additional damping elements on the sides of driving elements 17 opposite to damping elements 20. Since damping elements 20 are integrated in pockets 18 formed in the clamping disk, the axial installation height of transmission 1 is minimal. With driving elements 17 located on clamping disk 6, pockets 18 could just as easily be located in driving disk 15 or in driven gear 14.

What is claimed is:

1. A transmission, in particular for electric hand-held power tools, with a drive gear (23), which is driven by a drive, a driven gear (14), which meshes with the drive gear (23) and drives a spindle (2), and with a locking device, via which the spindle (2)—for the purpose of releasing and attaching tools—is capable of being coupled such that the spindle is non-rotatable relative to a circumferential wall (26) enclosing the locking device, which opens automatically when torque is transferred from the drive to the spindle (2), and which blocks automatically when torque is transferred from the spindle (2) to the drive, the driven gear (14) being rotatable relative to the spindle (2) around a limited circumferential angle, and a driving element (17) is non-rotatably coupled with the driven gear (14) in order to transfer torque to a counter-element (18) located on a clamping disk (6) of the locking device that is non-rotatably coupled with the spindle (2), wherein the locking device includes at least one resilient damping element (20) located between the driving element (17) and the counter-element (18) in the circumferential direction, wherein the clamping disk (6) includes, on an outer circumference, at least one first recess (9), which widens radially in a first circumferential direction, a first blocking element (11) that is movable in the radial direction and in both circumferential directions that is located in the first recess (9) and blocks the spindle (2) in the first circumferential direction when torque is transferred from the spindle (2) to the drive by clamping between an inner wall (25) of the first recess (9) and the circumferential wall (26), wherein at least one finger (16) that is non-rotatably connected with the driven gear (14) is provided in order that when the driven gear (14) is driven, the finger (16) pushes the first blocking element (11) in the circumferential direction out of a blocked position and into a released position, and holds the first blocking element in the released position, and wherein the first blocking element (11) extends axially out of said blocking element's particular recess (9, 10) in the direction towards the finger (16).

2. The transmission as recited in claim 1,
wherein the driving element (17) is designed as an axial extension, and the counter-element (18) is designed as a pocket, or vice-versa, which driving element (17) engages axially in the pocket (18) and bears against a radially extending pocket wall (19, 21) in order to transfer torque.

3. The transmission as recited in claim 1,
wherein a damping element (20) is located on either side of the driving element (17), the two sides pointing in opposite circumferential directions.

4. The transmission as recited in claim 1,
wherein the driving element (17) is located on a driving disk (15), which is non-rotatably coupled with the driven gear (14).

5. The transmission as recited in claim 1,
wherein the clamping disk (6) includes, on the outer circumference, at least one second recess (10), which widens radially in a second circumferential direction that is opposite to the first circumferential direction, a second blocking element (12) that is movable in the radial direction and in both circumferential directions is located in the second recess (10), wherein the second blocking element (12) blocks the spindle (2) in the second circumferential direction when torque is transferred from the spindle (2) to the drive by clamping between an inner wall (25) of the second recess (10) and the circumferential wall.

6. The transmission as recited in claim 4,
wherein the driving element (17) and the finger (16) are located on the driving disk (15), and the amount of play that the driving element (17) has in the counter-element (18) in both circumferential directions is dimensioned such that the first or second blocking element (11, 12) is displaceable in the first or second circumferential direction out of the blocked position via the finger (16).

* * * * *